(12) United States Patent
Oesch et al.

(10) Patent No.: US 10,907,714 B2
(45) Date of Patent: Feb. 2, 2021

(54) METHOD OF PROVIDING LIMITED SLIP IN A DIFFERENTIAL ASSEMBLY

(71) Applicant: Eaton Corporation, Cleveland, MI (US)

(72) Inventors: Jeffrey A. Oesch, Roseville, MI (US); Matthew G. Fox, Ceresco, MI (US)

(73) Assignee: Eaton Corporation, Cleveland, OH (US)

( * ) Notice: Subject to any disclaimer, the term of this patent is extended or adjusted under 35 U.S.C. 154(b) by 176 days.

(21) Appl. No.: 16/008,167

(22) Filed: Jun. 14, 2018

(65) Prior Publication Data
US 2018/0291994 A1 Oct. 11, 2018

Related U.S. Application Data

(63) Continuation of application No. 15/058,588, filed on Mar. 2, 2016, now Pat. No. 10,002,202, which is a
(Continued)

(51) Int. Cl.
*F16H 48/22* (2006.01)
*B60K 17/16* (2006.01)
(Continued)

(52) U.S. Cl.
CPC ............. *F16H 48/22* (2013.01); *B60K 17/20* (2013.01); *F16H 48/38* (2013.01); *F16H 48/08* (2013.01);
(Continued)

(58) Field of Classification Search
CPC ..... F16H 48/22; F16H 57/0452; F16H 57/045
See application file for complete search history.

(56) References Cited

U.S. PATENT DOCUMENTS 1,979,414 A 11/1934 Clifford
4,836,051 A 6/1989 Guimbretiere
(Continued)

FOREIGN PATENT DOCUMENTS

DE 3738280 A1 6/1989
DE 10010292 A1 9/2001
(Continued)

OTHER PUBLICATIONS

Chinese Office Action for Chinese Application No. 2014106054645 dated Oct. 10, 2017, 8 pages.
(Continued)

*Primary Examiner* — Sherry L Estremsky
(74) *Attorney, Agent, or Firm* — RMCK Law Group PLC

(57) ABSTRACT

A method of providing limited slip in a differential assembly includes interconnecting an axle and a differential assembly through a first slippable linkage. The axle is driven in rotation with a first housing of the differential assembly operable to be driven in rotation by a ring gear. A plurality of pinion gears of the differential assembly are positioned in the first housing and are driven in rotation by the first housing. A side gear is fixed to the axle and is meshed with at least some of the pinion gears. The axle is operable to slip relative to the first housing. The first housing, the plurality of pinion gears and the side gear are enclosed within a second housing. The axle extends from a first end positioned within both of the first housing and the second housing to a second end positioned outside of both of the first housing and the second housing.

13 Claims, 9 Drawing Sheets

Related U.S. Application Data continuation of application No. PCT/US2014/055114, filed on Sep. 11, 2014.

(60) Provisional application No. 61/878,685, filed on Sep. 17, 2013, provisional application No. 61/904,444, filed on Nov. 14, 2013, provisional application No. 62/028,583, filed on Jul. 24, 2014.

(51) Int. Cl.
*F16H 48/38* (2012.01)
*F16H 48/08* (2006.01)
*F16H 48/32* (2012.01)

(52) U.S. Cl.
CPC ........ *F16H 48/32* (2013.01); *F16H 2048/382* (2013.01)

(56) References Cited

U.S. PATENT DOCUMENTS

| | | |
|---|---|---|
| 5,582,557 A | 12/1996 | Dissett et al. |
| 7,390,278 B2 | 6/2008 | Crisher |
| 7,713,159 B2 | 5/2010 | Hirota et al. |
| 9,249,873 B2 * | 2/2016 | Pump ................ F16H 48/08 |
| 9,291,212 B2 * | 3/2016 | Nett ................ F16H 57/0471 |
| 2005/0026732 A1 * | 2/2005 | Krisher ................ F16H 48/08 |
| | | 475/86 |
| 2006/0211532 A1 | 9/2006 | Krisher |
| 2010/0009798 A1 * | 1/2010 | Keller ................ F16H 48/22 |
| | | 475/86 |

FOREIGN PATENT DOCUMENTS

| | | |
|---|---|---|
| EP | 1502800 A1 | 2/2005 |
| GB | 1224034 A | 3/1971 |
| GB | 2424251 A | 9/2006 |
| WO | 2007133418 A2 | 11/2007 |

OTHER PUBLICATIONS

International Search Report and Written Opinion for International Application No. PCT/US2014/055114 dated Dec. 8, 2014, 10 pages.

\* cited by examiner

METHOD OF PROVIDING LIMITED SLIP IN A DIFFERENTIAL ASSEMBLY

CROSS-REFERENCE TO RELATED APPLICATIONS

This application is a continuation of U.S. application Ser. No. 15/058,588 filed Mar. 2, 2016, which is a continuation of International Application No. PCT/US2014/055114 filed Sep. 11, 2014, which claims the benefit of U.S. Patent Application No. 61/878,685 filed on Sep. 17, 2013, U.S. Patent Application No. 61/904,444 filed on Nov. 14, 2013, and U.S. Patent Application No. 62/028,583 filed on Jul. 24, 2014. The disclosures of the above applications are incorporated herein by reference.

FIELD

The present disclosure relates generally to differential assemblies and, more particularly, to a bolt-on configuration of a front wheel drive electronic limited slip differential.

BACKGROUND

Differentials are provided on vehicles to permit an outer drive wheel to rotate faster than an inner drive wheel during cornering as both drive wheels continue to receive power from the engine. While differentials are useful in cornering, they can allow vehicles to lose traction, for example, in snow or mud or other slick mediums. If either of the drive wheels loses traction, it will spin at a high rate of speed and the other wheel may not spin at all. To overcome this situation, limited-slip differentials were developed to shift power from the drive wheel that has lost traction and is spinning, to the drive wheel that is not spinning.

A driveshaft can drive the differential through the use of a bevel gear that meshes with a ring gear mounted to a housing or case of the differential. The gear arrangement can also include a pair of side gears that are mounted for rotation with the respective output shafts. A series of cross pins or pinion gear shafts are fixedly mounted to the housing for rotation therewith. Pinion gears are individually mounted for rotation on the pinion gear shafts and are each in a meshing relationship with one of the side gears.

Some differential gear mechanisms include traction modifying differentials. Typically, a clutch pack can be disposed between one of the side gears and an adjacent surface of the differential case. The clutch pack or locking mechanism is operable to limit relative rotation between the gear case and the one side gear. In such differentials, engaging the clutch pack or locking mechanism (retarding differentiation) is achieved by one of several different approaches. Some configurations include a piston that actuates to cause the clutch pack to move between open, locked, and partially locked conditions. In some examples it can be challenging to provide a simple arrangement to deliver hydraulic fluid to the piston without substantial modification of existing hardware.

The background description provided herein is for the purpose of generally presenting the context of the disclosure. Work of the presently named Inventors, to the extent it is described in this background section, as well as aspects of the description that may not otherwise qualify as prior art at the time of filing, are neither expressly nor impliedly admitted as prior art against the present disclosure.

SUMMARY

A limited slip differential assembly can include a sleeve, a support shaft, and a clutch assembly. The sleeve can have a sleeve aperture centered on and extending along an axis. The sleeve can also have a first set of splines projecting inwardly from the sleeve aperture. The sleeve can be operable to engage an axle through the first set of splines. The support shaft can have an outer surface, a support shaft aperture centered on and extending along the axis, and a second set of splines projecting from the outer surface. The support shaft can be adjacent to the sleeve along the axis and be operable to encircle and freely rotate relative to the axle. The clutch assembly can be operable to selectively interlock the sleeve and the support shaft.

According to additional features, the limited slip differential assembly can also include a housing defining an interior cavity containing at least a portion of the clutch assembly. The interior cavity can be eccentric with respect to the sleeve aperture and the support shaft aperture. The clutch assembly can include a clutch basket fixed for rotation with the support shaft and at least partially encircling the sleeve. The clutch assembly can also have a clutch pack including a first subset of plates fixed for rotation with the sleeve and a second subset of plates fixed for rotation with the clutch basket. The clutch assembly can also include a piston positioned adjacent to a first end of the clutch pack and a fluid delivery system operable to direct fluid against the piston whereby the piston is urged to press the clutch pack against a portion of the clutch basket. The clutch basket and the support shaft can be interconnected through a third set of splines defined by the clutch basket and a fourth set of splines defined by the support shaft. The second set of splines and the fourth set of splines of the support shaft can be spaced from one another along the axis.

A method of providing limited slip in a differential assembly can include interconnecting an axle and a differential assembly through a first linkage being slippable. The method can also include coupling the axle and the differential assembly through a second linkage being operable to selectively and positively lock the axle and a portion of the differential assembly together. The method can also include connecting the second linkage to the axle at a position spaced from the differential assembly.

According to additional features, the method can also include incorporating a clutch assembly in the second linkage. The method can also include positioning the first linkage within a first housing and positioning the clutch assembly outside of the first housing. The method can also include positioning the clutch assembly within a second housing and linking the first housing and the second housing through a third housing. The method can also include positioning the first linkage within a housing and projecting less than all of the second linkage into the housing. The method can also include enclosing at least a portion of the second linkage in a housing and shaping the housing to be eccentric relative to the second linkage.

According to other features, interconnecting the axle and the differential assembly through a first linkage can include driving the axle in rotation with a first housing of the differential assembly operable to be driven in rotation by the ring gear, a plurality of pinion gears of the differential assembly positioned in the first housing can be driven in rotation by the first housing, and a side gear can be fixed to the axle and meshed with at least some of the pinion gears. The axle can be operable to slip relative to the first housing. Interconnecting the axle and the differential assembly through a first linkage can also include enclosing the first housing, the plurality of pinion gears, and the side gear within a second housing, wherein the axle extends from a first end positioned within both of the first housing and the second housing to a second end positioned outside of both of the first housing and the second housing.

In other features, coupling the axle and the differential assembly through a second linkage can include positioning a sleeve on the axle wherein the sleeve has a sleeve aperture centered on and extending along an axis and also has a first set of splines projecting inwardly from the sleeve aperture. The first set of splines can engage a second set of splines on the axle. Coupling the axle and the differential assembly through a second linkage can also include encircling the axle with a support shaft wherein the support shaft includes an outer surface, a support shaft aperture centered on and extending along the axis, and a third set of splines projecting from the outer surface. Coupling the axle and the differential assembly through a second linkage can also include positioning a clutch assembly to selectively interlock the sleeve and the support shaft.

A method of providing limited slip in a differential assembly according to additional features includes interconnecting an axle and a differential assembly through a first slippable linkage. The axle is driven in rotation with a first housing of the differential assembly operable to be driven in rotation by a ring gear. A plurality of pinion gears of the differential assembly are positioned in the first housing and are driven in rotation by the first housing. A side gear is fixed to the axle and is meshed with at least some of the pinion gears. The axle is operable to slip relative to the first housing. The first housing, the plurality of pinion gears and the side gear are enclosed within a second housing. The axle extends from a first end positioned within both of the first housing and the second housing to a second end positioned outside of both of the first housing and the second housing.

In other features, the axle and the differential assembly are coupled through a second linkage. The second linkage is connected to the axle at a position spaced from the differential assembly. A sleeve is positioned on the axle. The sleeve has a sleeve aperture centered on and extending along an axis and also has a first set of splines projecting inwardly from the sleeve aperture. The first set of splines engage a second set of splines on the axle.

A limited slip differential assembly can include a differential assembly, a second housing, a sleeve, a support shaft, and a clutch assembly. The differential assembly can have a first housing or case, a plurality of pinion gears, at least one side gear, and at least one axle. The first housing can be operable to mesh with a ring gear for concurrent rotation. The plurality of pinion gears can be positioned in the first housing and be driven in rotation by the first housing. The at least one side gear can be meshed with at least some of the pinion gears. The at least one axle can extend along the axis and be fixed to the at least one side gear for concurrent rotation about the axis. The second housing can enclose the first housing, the plurality of pinion gears, and the side gear. The axle can extend from a first end inside both of the first housing and the second housing to a second end spaced from an interior cavity of the second housing. The sleeve can have a sleeve aperture centered on and extending along the axis. The sleeve can also have a first set of splines projecting inwardly from the sleeve aperture and engaging the axle through a second set of splines projecting from the axle. The support shaft can project into the second housing and have an outer surface. The support shaft can also have a support shaft aperture centered on and extending along the axis. The support shaft can also have a third set of splines projecting from the outer surface. The support shaft can be adjacent to the sleeve along the axis and be operable to encircle and freely rotate relative to the axle. The third set of splines can engage the first housing through a fourth set of splines projecting from the first housing. The clutch assembly can be operable to selectively interlock the sleeve and the support shaft.

According to additional features, the limited slip differential assembly can also include a third housing encircling at least a portion of the clutch assembly and can be eccentric with respect to the axis. The limited slip differential assembly can also include a fourth housing encircling at least a portion of the support shaft and interconnecting the second and third housings. The second housing can include a seal boss. The fourth housing can include a first portion that abuts the seal boss and a second portion that at least partially surrounds the seal boss.

According to other features, the clutch pack can include a first subset of plates fixed for rotation with the sleeve and a second subset of plates fixed for rotation with the support shaft. The clutch pack can also include a piston. The clutch pack can also include a fluid delivery system operable to direct fluid against the piston. The piston can be urged to press the clutch pack and thereby interlock the axle and the first housing. The fluid delivery system can include a pump mounted in a well integrally-formed in the third housing.

BRIEF DESCRIPTION OF THE DRAWINGS

The present disclosure will become more fully understood from the detailed description and the accompanying drawings, wherein.

DETAILED DESCRIPTION

Figure 1:
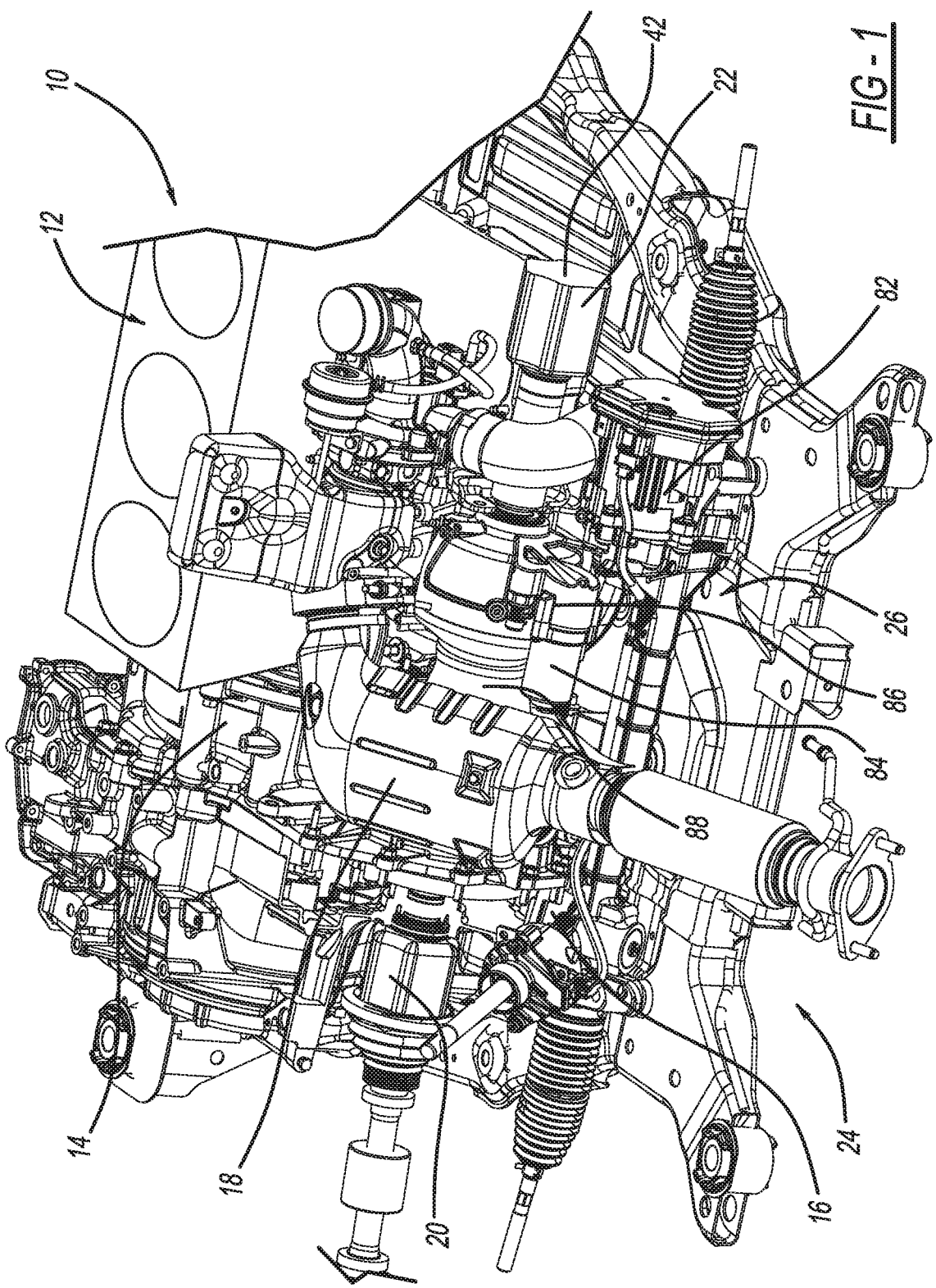
FIG. 1 is a first front perspective view of a bolt-on electronic limited slip differential assembly constructed in accordance with an example of the present disclosure and shown on a front wheel drive transaxle.

A plurality of different embodiments of the present disclosure is shown in the Figures of the application. Similar features are shown in the various embodiments of the present disclosure. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features can be structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

Figure 2:
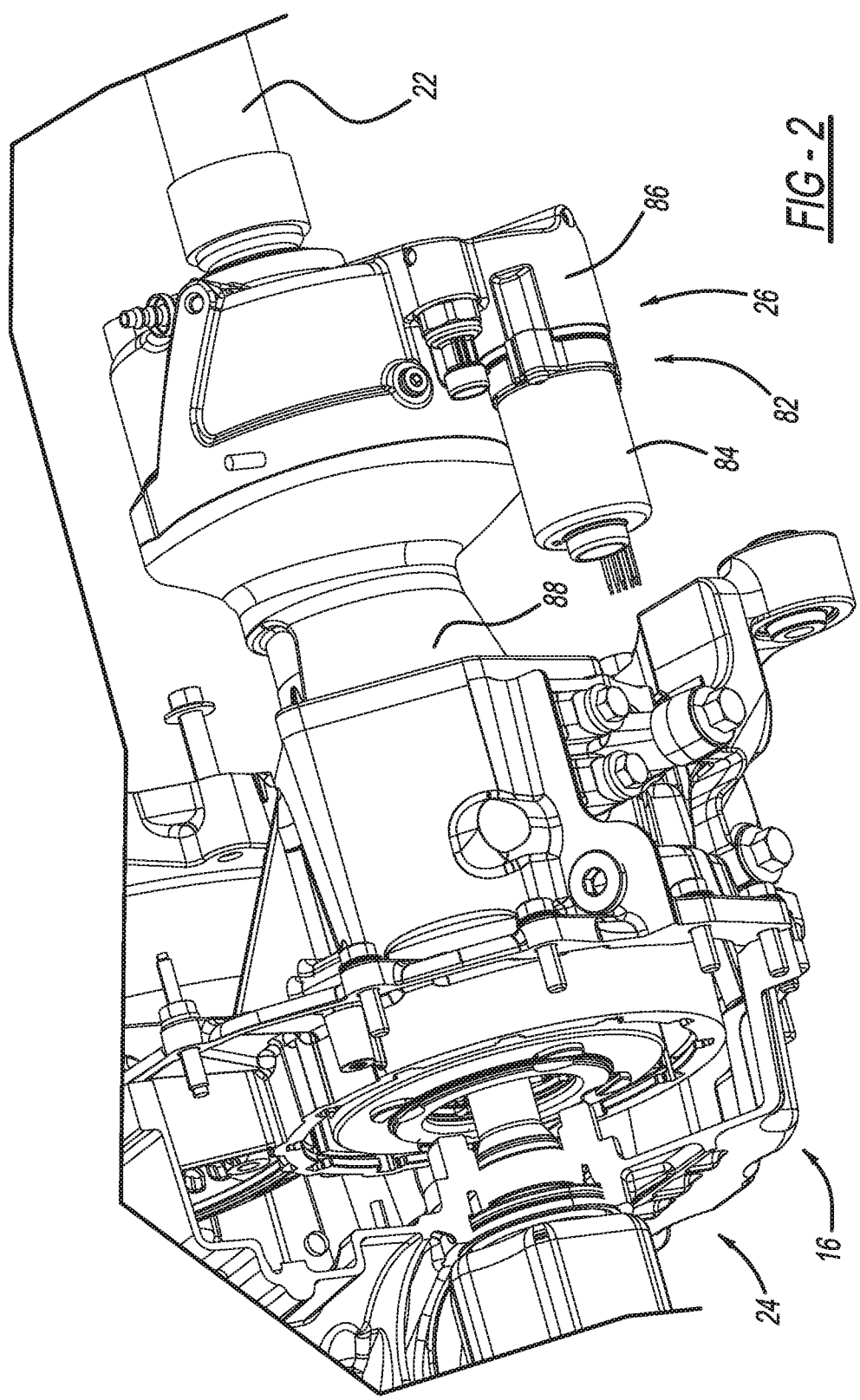
FIG. 2 is a second front perspective view of a portion of the limited slip differential assembly shown in FIG. 1.
Figure 3:
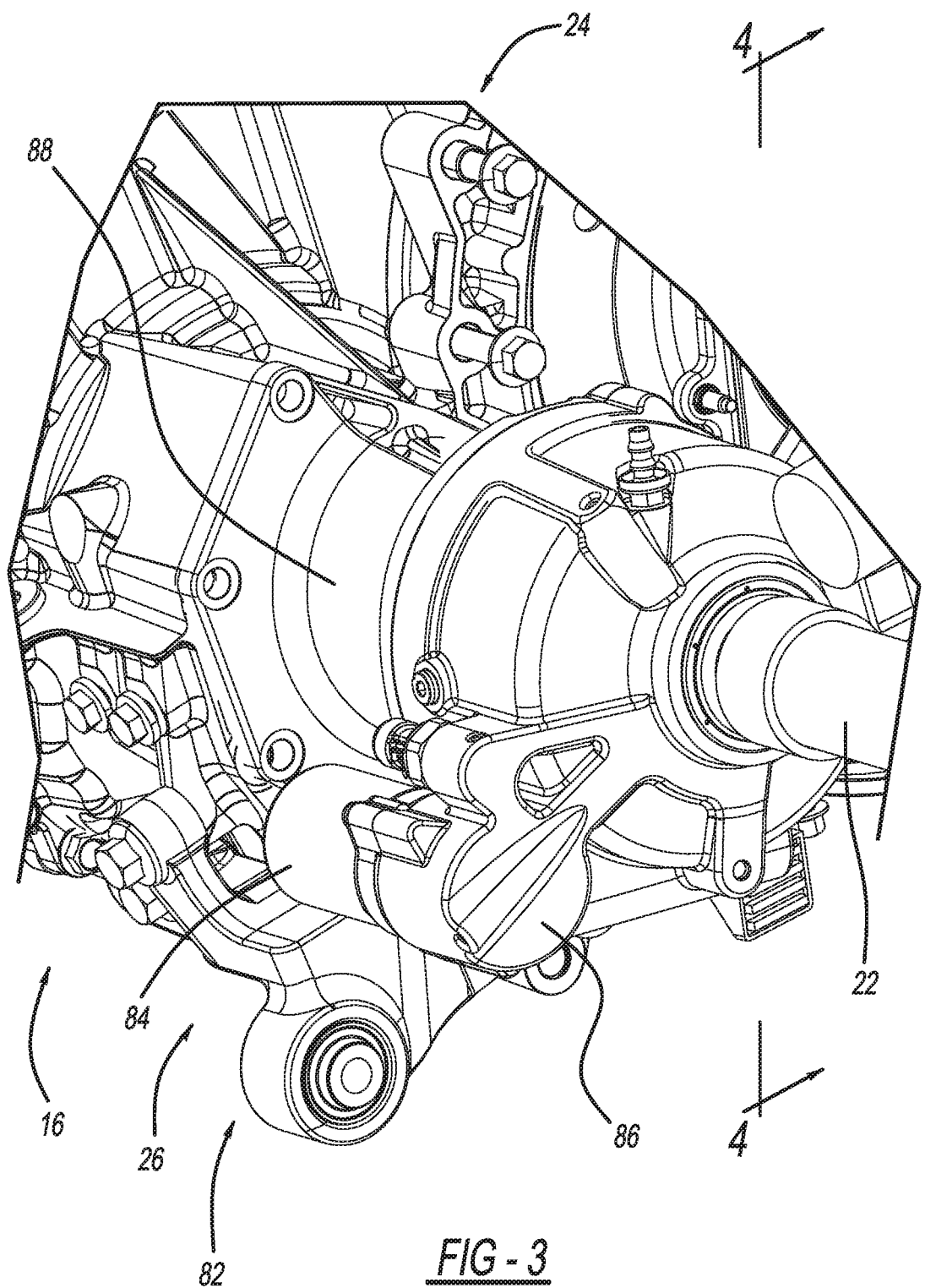
FIG. 3 is a magnified portion of FIG. 1.

With initial reference to FIGS. 1-3, an exemplary vehicle driveline is shown and generally identified with reference numeral 10. The exemplary vehicle driveline 10 described herein is for a front wheel drive vehicle having a transversely mounted engine 12 (shown only as a partial engine block in FIG. 1), although other configurations can be utilized with the present disclosure. The engine 12 can provide a rotary output to a transmission 14. The transmission 14 can provide a rotary output to a differential assembly 16. The differential assembly 16 can be positioned below an exhaust manifold 18. The exhaust manifold 18 has been omitted from FIGS. 2-3. The differential assembly 16 can drive a pair of axle shafts 20 and 22 that are connected to front drive wheels (not specifically shown).

A limited slip differential assembly 24 can include the differential assembly 16 and a slip limiting arrangement 26. In general, the limited slip differential assembly 24 can function as a traditional open differential during normal operating conditions through the differential assembly 16. When an event occurs in which a bias torque is required, such as when a loss in traction at one of the wheels connected with the axles 20, 22 is detected or anticipated, the slip limiting arrangement 26 can be selectively actuated in order to generate the optimum bias ratio for the situation.

Figure 4:
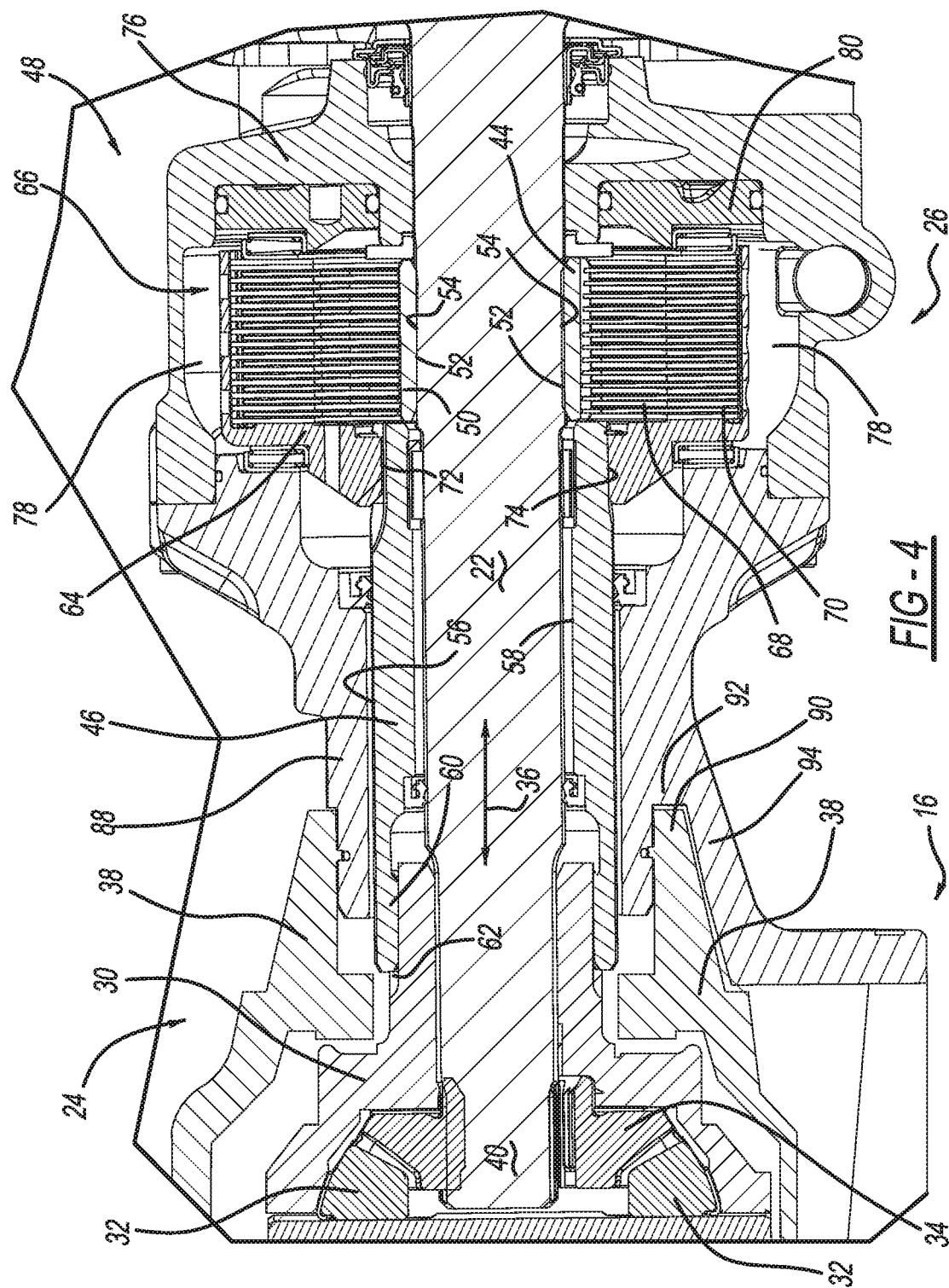
FIG. 4 is a partial cross-section taken through section lines 4-4 in FIG. 3
Figure 5:
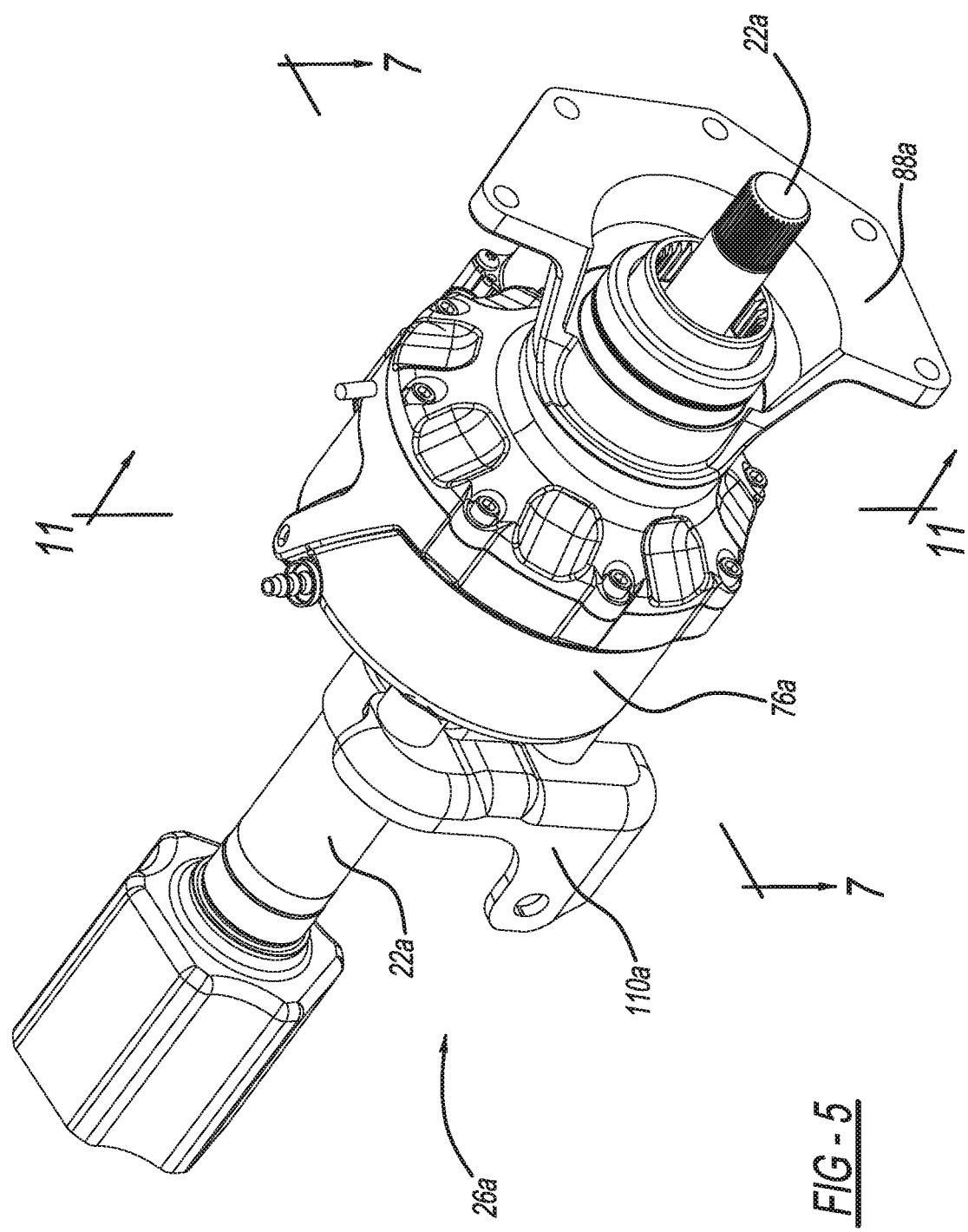
FIG. 5 is a first rear perspective view of a portion of a limited slip differential assembly constructed in accordance with an example of the present disclosure.
Figure 6:
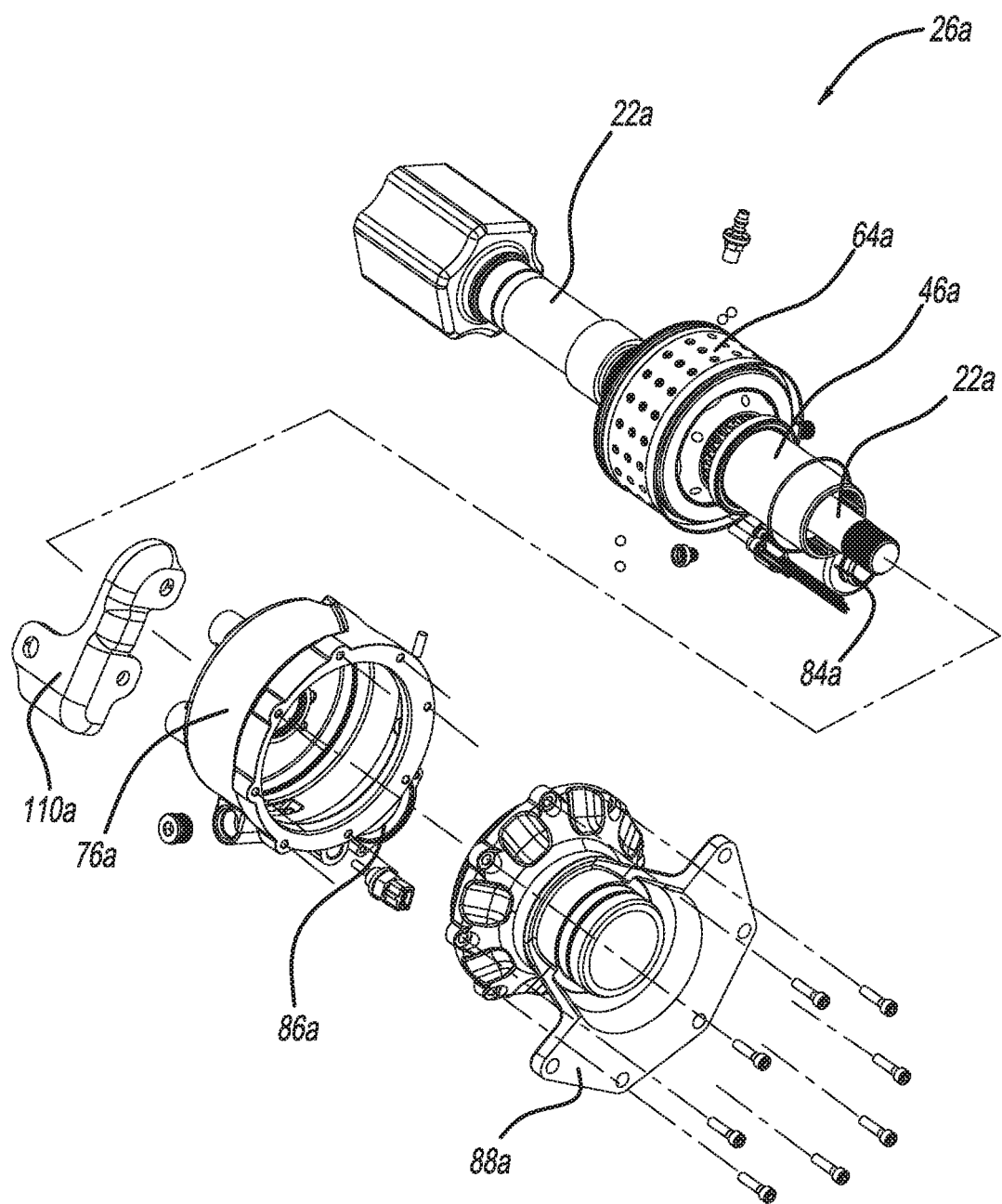
FIG. 6 is an exploded view of the structures shown in FIG. 5.

Referring now to FIG. 4, the differential assembly 16 can include a ring gear (not shown), a first housing 30, a plurality of pinion gears 32, and at least one side gear 34. The first housing 30 can be rotatable about an axis 36. Rotary output from the transmission 14 (referenced in FIG. 1) can be transmitted to the ring gear through the vehicle's drive shaft and a bevel gear. The first housing 30, or crank case, can be meshed with the ring gear for concurrent rotation. The plurality of pinion gears 32 can be positioned in the first housing 30 and can be driven in rotation by the first housing 30. Each of the plurality of pinion gears 32 can be mounted on posts fixed to the first housing 30. The at least one side gear 34 can be meshed with at least some of the pinion gears 32. The axle 22 can extend along the axis 36 and can be fixed to the at least one side gear 34 for concurrent rotation about the axis 36.

The limited slip differential assembly 24 can also include a second housing 38 enclosing the first housing 30, the plurality of pinion gears 32, and the at least one side gear 34. The axle 22 can extend from a first end 40 inside both of the first housing 30 and the second housing 38 to a second end 42 (shown in FIG. 1) spaced from an interior cavity of the second housing 38.

With continuing reference to FIG. 4, the slip limiting arrangement 26 can include a sleeve 44, a support shaft 46, and a clutch assembly 48. The sleeve 44 can have a sleeve aperture 50 centered on and extending along the axis 36. The sleeve 44 can also have a first set of splines 52 projecting inwardly from the sleeve aperture 50. The first set of splines 52 can engage the axle 22 through a second set of splines 54 projecting from the axle 22. The sleeve 44 and the axle 22 can thus be fixed for rotation together.

The support shaft 46 can project into the second housing 38 and have an outer surface 56. The support shaft 46 can also have a support shaft aperture 58 centered on and extending along the axis 36. The support shaft 46 can also have a third set of splines 60 projecting from an inner surface defining the support shaft aperture 58. The support shaft 46 can be adjacent to the sleeve 44 along the axis 36 and be operable to encircle and freely rotate relative to the axle 22. The third set of splines 60 can engage the first housing 30 through a fourth set of splines 62 projecting from the first housing 30.

The clutch assembly 48 can be operable to selectively interlock the sleeve 44 and the support shaft 46. The clutch assembly 48 can include a clutch basket 64 fixed for rotation with the support shaft 46. The clutch basket 64 can at least partially encircle the sleeve 44. The clutch assembly 48 can also include a clutch pack 66. The clutch pack 66 can include a first subset of plates 68 fixed for rotation with the sleeve 44 and a second subset of plates 70 fixed for rotation with the clutch basket 64 and the support shaft 46. The plates 68, 70 can be coated in friction material or plates of friction material can be positioned adjacent plates 68, 70. The clutch basket 64 and the support shaft 46 can be interconnected through a fifth set of splines 72 defined by the clutch basket 64 and a sixth set of splines 74 defined by the support shaft 46. The third set of splines 60 and the sixth set of splines 74 of the support shaft 46 are spaced from one another along the axis 36.

A housing 76 defining an interior cavity 78 can contain at least a portion of the clutch assembly 48. The interior cavity 78 can be eccentric with respect to the sleeve aperture 50 and the support shaft aperture 58. This eccentricity is shown in FIG. 4 by the difference in the gap between the clutch basket 64 and the inner surface of the housing 76 between the top and bottom portions in FIG. 4.

Referring now to FIGS. 1-4, the clutch assembly 48 can also include a piston 80 and a fluid delivery system 82. The piston 80 can be positioned adjacent to a first end of the clutch pack 66. The clutch pack 66 can be positioned between the piston 80 and a portion of the clutch basket 64. The fluid delivery system 82 can include a pump 84 mounted in a well integrally-formed in a boss 86 of the housing. The fluid delivery system 82 can be operable to direct fluid against the piston 80 whereby the piston 80 is urged to press the clutch pack 66 against the clutch basket 64. This also urges the first subset of plates 68, the second subset of plates 70, and any friction plates together and interlocks the sleeve 44 and the support shaft 46. This also interlocks the axle 22 and the first housing 30.

The axle 22 and the differential assembly 16 can be interconnected through a first linkage being slippable. The first linkage can be defined by the first housing 30, the pinion gears 32, and the side gear 34. The axle 22 and the differential assembly 16 can also be coupled through a second linkage being operable to selectively and positively lock the axle 22 and a portion of the differential assembly 16 together. The second linkage can be defined by the sleeve 44, the support shaft 46, and the clutch assembly 48. The second linkage can be connected to the axle 22 at a position spaced from the differential assembly.

The first linkage can thus be positioned within the second housing 38, and the clutch assembly 48 can be positioned outside of the second housing 38. The clutch assembly 48 can be positioned within the housing 76, and a housing 88 can link the second housing 38 and the housing 76. The second housing 38 can include a seal boss 90. The housing 88 can include a first portion 92 that abuts the seal boss 90 and a second portion 94 that at least partially surrounds the seal boss 90. In the exemplary embodiment, less than all of the second linkage projects into the second housing 38. A portion of the support shaft 46 can project into the second housing 38. At least a portion of the second linkage can be enclosed in the housing 76, and the housing 76 can be shaped to be eccentric relative to the second linkage.

Figure 7:
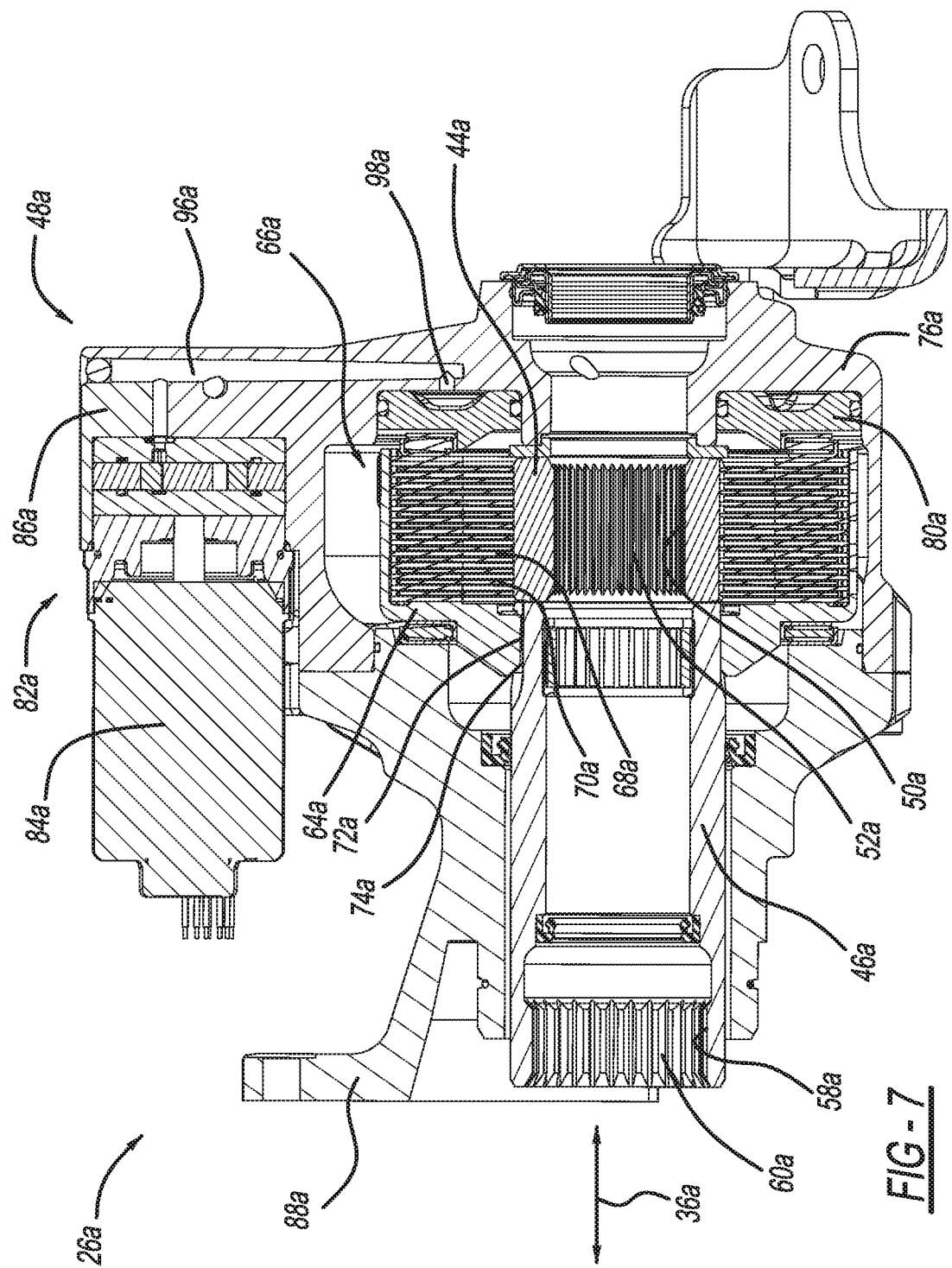
FIG. 7 is a cross-section taken through section lines 7-7 in FIG. 5.

A second exemplary slip limiting arrangement 26a is disclosed in FIGS. 5-11. As best shown in FIG. 7, the slip limiting arrangement 26a can include a sleeve 44a, a support shaft 46a, and a clutch assembly 48a. The sleeve 44a can have a sleeve aperture 50a centered on and extending along an axis 36a. The sleeve 44a can also have a first set of splines 52a projecting inwardly from the sleeve aperture 50a. The first set of splines 52a can engage an axle 22a (shown in FIGS. 5, 6 and 11) through a second set of splines 54a projecting from the axle 22a. The sleeve 44a and the axle 22a can thus be fixed for rotation together.

The support shaft 46a can project into a second housing, such as second housing 38, and can have a support shaft aperture 58a centered on and extending along the axis 36a. The support shaft 46a can also have a third set of splines 60a projecting from the support shaft aperture 58a. The support shaft 46a can be adjacent to the sleeve 44a along the axis 36a and be operable to encircle and freely rotate relative to the axle 22a. The third set of splines 60a can engage a first housing of a differential, such as the first housing 30 of differential 16, through a fourth set of splines projecting from the first housing.

The clutch assembly 48a can be operable to selectively interlock the sleeve 44a and the support shaft 46a. The clutch assembly 48a can include a clutch basket 64a fixed for rotation with the support shaft 46a. The clutch basket 64a can at least partially encircle the sleeve 44a. The clutch assembly 48a can also include a clutch pack 66a. The clutch pack 66a can include a first subset of plates 68a fixed for rotation with the sleeve 44a and a second subset of plates 70a fixed for rotation with the clutch basket 64a and the support shaft 46a. The clutch basket 64a and the support shaft 46a can be interconnected through a fifth set of splines 72a defined by the clutch basket 64a and a sixth set of splines 74a defined by the support shaft 46a.

Figure 11:
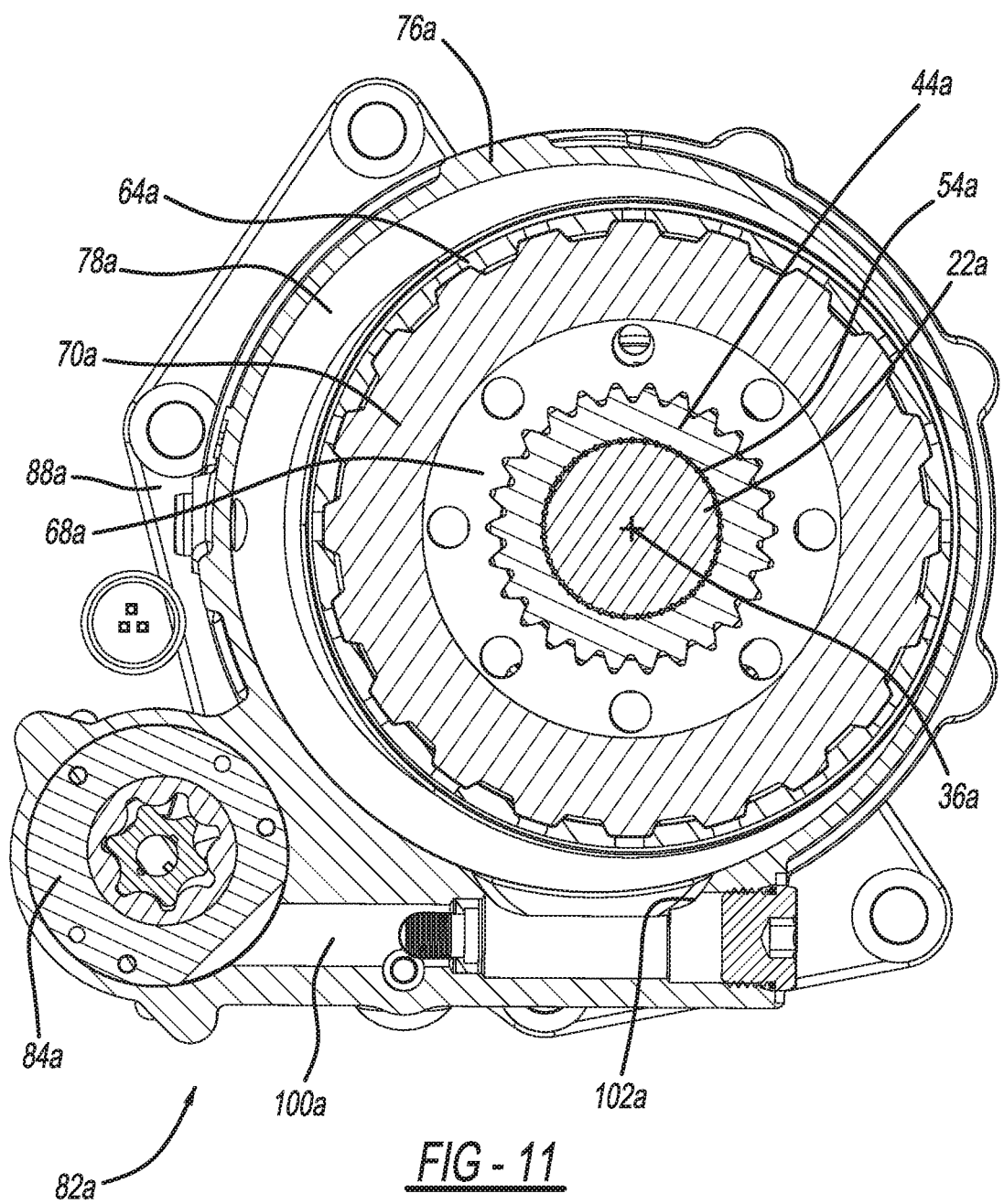
FIG. 11 is a cross-section taken through section lines 11-11 in FIG. 5.

A housing 76a defining an interior cavity 78a can contain at least a portion of the clutch assembly 48a. A housing 88a can link the housing 76a to a second housing, such as second housing 38. A mounting bracket 110a can affix the housing 76a to a vehicle or a component of a vehicle such as an engine. The interior cavity 78a can be eccentric with respect to the sleeve aperture 50a and the support shaft aperture 58a. This eccentricity is shown in FIG. 11 by the difference in the gap between the clutch basket 64a and the inner surface of the housing 76a between the left and right sides in FIG. 4.

The clutch assembly 48a can also include a piston 80a and a fluid delivery system 82a. The piston 80a can be positioned adjacent to a first end of the clutch pack 66a. The clutch pack 66a can be positioned between the piston 80a and a portion of the clutch basket 64a. The fluid delivery system 82a can include a pump 84a mounted in a well integrally-formed in a boss 86a of the housing. The fluid delivery system 82a can be operable to direct fluid against the piston 80a whereby the piston 80a is urged to press the clutch pack 66a against the clutch basket 64a. This also urges the first subset of plates 68a, the second subset of plates 70a, and any friction plates together and interlocks the sleeve 44a and the support shaft 46a. This also interlocks the axle 22a and a first housing.

Fluid passageways of the fluid delivery system 82a can be defined within the housing 76a. As shown in FIG. 7, a delivery passageway 96a can extend through the housing 76a from the pump 84a to an outlet 98a. Fluid can be directed through the delivery passageway 96a and out of the outlet 98a by the pump 84a. The pressurized fluid can act on the piston 80a. As shown in FIG. 11, a pump intake passageway 100a can extend through the housing 76a from an inlet 102a to the pump 84a.

Figures 8, 9:
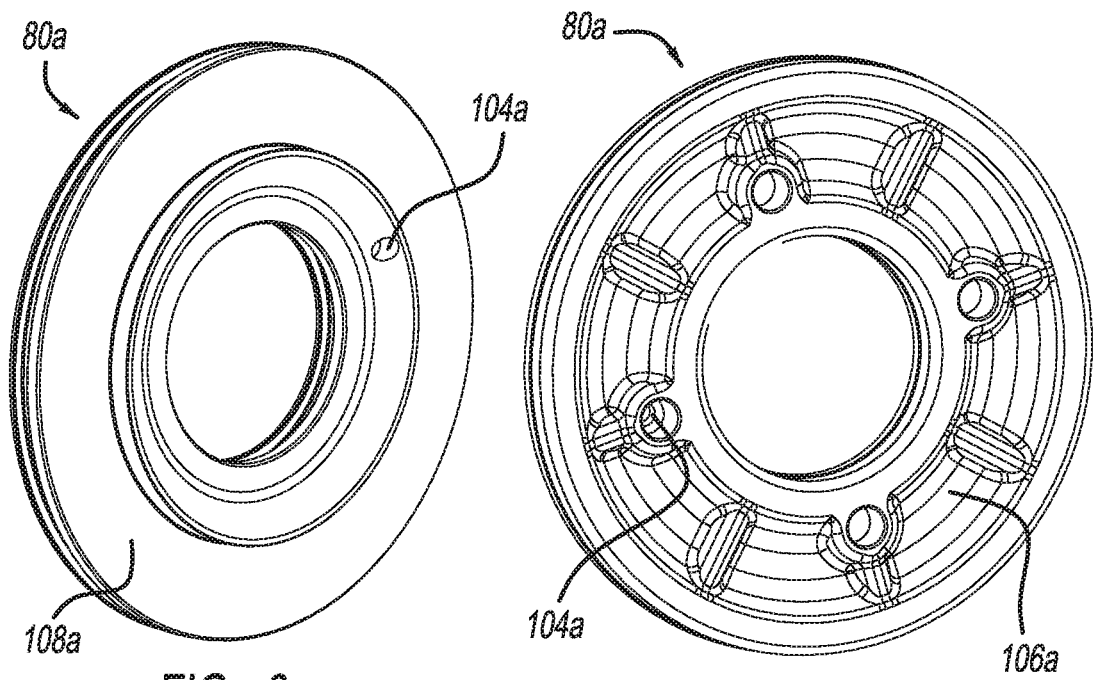
FIG. 8 is a front perspective view of a piston constructed in accordance with an example of the present disclosure.
FIG. 9 is a rear perspective view of the piston shown in FIG. 8.
Figure 10:
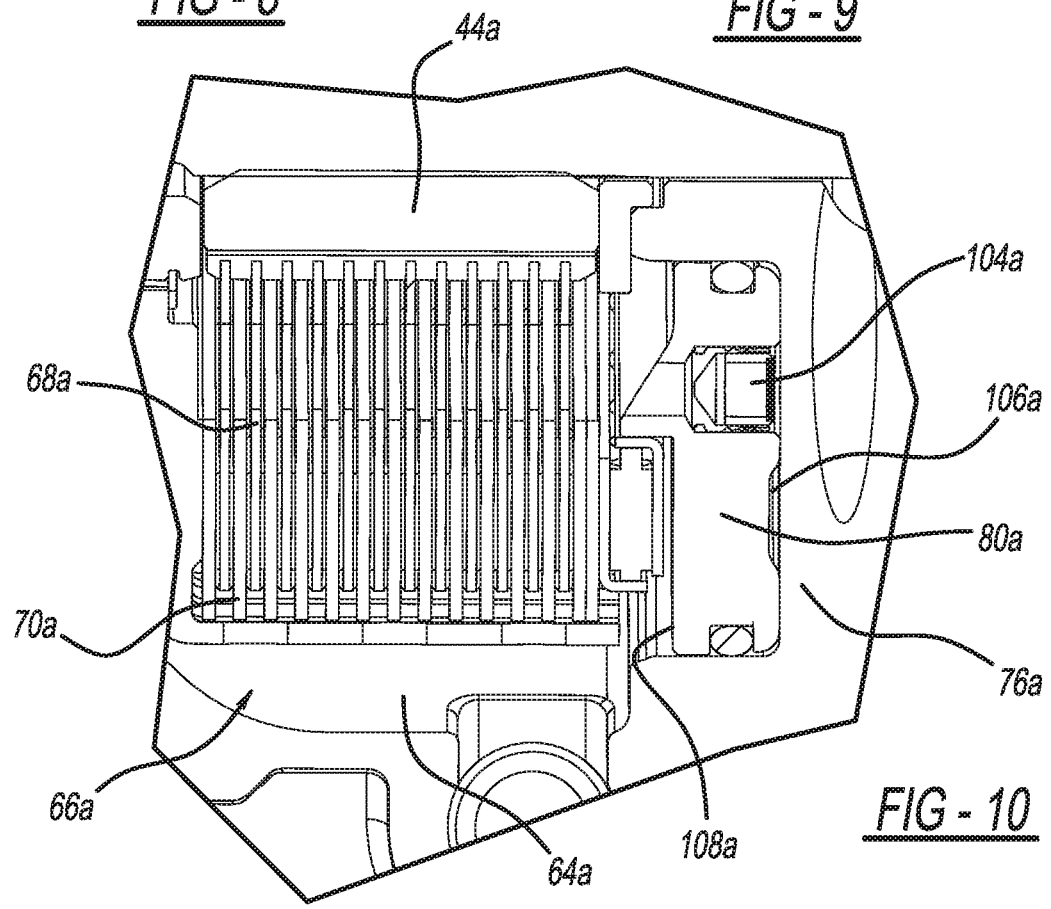
FIG. 10 is a cross-section taken in plane containing a central axis of the piston shown in FIGS. 8-9 and also containing a central axis of an orifice mounted in the piston.

As shown in FIGS. 8-10, the piston 80a can include an orifice 104a. The orifice 104a can selectively communicate fluid between a rear face 106a of the piston 80a and a front face 108a. Pressurized fluid is directed to the rear face 106a. The orifice 104a can be tuned such that when fluid pressure acting on the rear face 106a reaches or surpasses a predetermined level, the orifice 104a can open to allow the passage of fluid and reduce the fluid pressure acting on the rear face 106a.

The axle 22a and a differential assembly can be coupled through a second linkage being operable to selectively and positively lock the axle 22a and a portion of the differential assembly together. The second linkage can be defined by the sleeve 44a, the support shaft 46a, and the clutch assembly 48a. The second linkage can be connected to the axle 22a at a position spaced from the differential assembly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of providing limited slip in a differential assembly comprising:
    interconnecting an axle and a differential assembly through a slippable first linkage defined by the axle and the differential assembly;
    coupling the axle and the differential assembly through a second linkage being operable to selectively and positively lock the axle and a portion of the differential assembly together, the second linkage including a clutch assembly having a clutch basket;
    connecting the second linkage to the axle at a position spaced from the differential assembly;
    positioning the first linkage within a first housing;
    positioning the clutch assembly within a second housing;
    enclosing the first housing within a third housing; and
    linking the second housing and the third housing through a fourth housing,
    wherein coupling the axle and the differential assembly through the second linkage includes (i) encircling the axle with a support shaft, wherein the support shaft includes first splines projecting from an outer surface that are meshed for rotation with the clutch basket, and second splines projecting from an inner surface that are meshed with third splines projecting from an outer surface of the first housing and (ii) positioning a sleeve on the axle, wherein the sleeve includes fourth splines projecting from an inner surface to engage fifth splines on the axle.

2. The method claim 1 further comprising:
    positioning the clutch assembly outside of the first housing.

3. The method of claim 2 further comprising:
    providing the third housing with a seal boss; and
    providing the fourth housing with a first portion that abuts the seal boss and a second portion surrounds the seal boss.

4. The method of claim 1 wherein interconnecting the axle and the differential assembly through a first linkage further comprises:
    positioning the axle in driving rotation with the first housing of the differential assembly operable to be driven in rotation by a ring gear,
    positioning a plurality of pinion gears of the differential assembly in the third first housing to be driven in rotation by the first housing,
    positioning a side gear fixed to the axle and meshed with at least some of the pinion gears, wherein the axle is operable to slip relative to the first housing; and
    enclosing the third housing, the plurality of pinion gears, and the side gear within the first housing, wherein the axle extends from a first end positioned within both of the first housing and the first housing to a second end positioned outside of both of the first housing and the first housing.

5. The method of claim 4 wherein coupling the axle and the differential assembly through a second linkage further comprises:
    positioning the clutch assembly to selectively interlock the sleeve and the support shaft.

6. A method of providing limited slip in a differential assembly, the method comprising:
    interconnecting an axle and a differential assembly through a slippable first linkage defined by the axle and the differential assembly, including:
        positioning the axle in driving rotation within a first housing of the differential assembly operable to be driven in rotation by a ring gear,
        positioning a plurality of pinion gears of the differential assembly in the first housing to be driven in rotation by the first housing,
        positioning a side gear fixed to the axle and meshed with at least some of the pinion gears, wherein the axle is operable to slip relative to the first housing; and
        enclosing the first housing, the plurality of pinion gears, and the side gear within a second housing, wherein the axle extends from a first end positioned within both of the first housing and the second housing to a second end positioned outside of both of the first housing and the second housing;
    coupling the axle and the differential assembly through a second linkage operable to selectively and positively lock the axle and a portion of the differential assembly together;
    enclosing at least a portion of the second linkage in a clutch housing; and
    coupling the second housing and the clutch housing with a link housing extending therebetween,
    wherein the second linkage includes (i) a clutch assembly disposed in the clutch housing and including a clutch basket, and (ii) a support shaft encircling axle with a first end having inwardly extending first splines meshed for rotation with second splines extending outwardly from the first housing, and a second end with outwardly extending third splines meshed for rotation with fourth splines extending inwardly from the clutch basket.

7. The method of claim 6 wherein coupling the axle and the differential comprises:
    connecting the second linkage to the axle at a position spaced from the differential assembly.

8. The method of claim 6 wherein coupling the axle and the differential assembly through a second linkage further comprises:
    positioning a sleeve on the axle wherein the sleeve has a sleeve aperture centered on and extending along an axis and also has a first set of splines projecting inwardly from the sleeve aperture, wherein the first set of splines engage a second set of splines on the axle.

9. The method of claim 8 wherein coupling the axle and the differential assembly through a second linkage further comprises:
    positioning the clutch assembly to selectively interlock the sleeve and the support shaft.

10. The method of claim 9 further comprising:
    positioning the first linkage within the second housing; and
    projecting less than all of the second linkage into the second housing.

11. The method of claim 6 further comprising:
    positioning the clutch assembly outside of the first housing.

12. The method of claim 10 further comprising:
    providing the second housing with a seal boss; and
    providing the link housing with a first portion that abuts the seal boss and a second portion that surrounds the seal boss.

13. A method of providing limited slip in a differential assembly, the method comprising:
    interconnecting an axle and a differential assembly through a slippable first linkage defined by the axle and the differential assembly;
    wherein interconnecting the axle and differential assembly comprises driving the axle in rotation with a first housing of the differential assembly operable to be driven in rotation by a ring gear, a plurality of pinion gears of the differential assembly positioned in the first housing and driven in rotation by the first housing, and a side gear fixed to the axle and meshed with at least some of the pinion gears, wherein the axle is operable to slip relative to the first housing;
    wherein interconnecting the axle and differential assembly further comprises enclosing the first housing, the plurality of pinion gears, and the side gear within a second housing, wherein the axle extends from a first end positioned within both of the first housing and the second housing to a second end positioned outside of both of the first housing and the second housing;
    coupling the axle and the differential assembly through a second linkage;
    enclosing at least a portion of the second linkage in a clutch housing;
    wherein coupling the axle and the differential assembly through a second linkage comprises positioning a sleeve on the axle wherein the sleeve has a sleeve aperture centered on and extending along an axis and also has a first set of splines projecting inwardly from the sleeve aperture, wherein the first set of splines engage a second set of splines on the axle;
    wherein coupling the axle and the differential assembly through a second linkage further comprises encircling the axle with a support shaft wherein the support shaft includes an inner surface, a support shaft aperture centered on and extending along the axis, first support shaft splines projecting from the outer surface that are meshed for rotation with clutch housing splines extending from the clutch housing, and support shaft splines projecting from the inner surface and that are meshed for rotation with differential splines extending from the first housing;

wherein coupling the axle and the differential assembly through a second linkage further comprises positioning a clutch assembly to selectively interlock the sleeve and the support shaft; and coupling the second housing and the clutch housing with a link housing having a first portion that abuts a seal boss of the second housing, and a second portion that surrounds the seal boss of the second housing.

\* \* \* \* \*